US012594529B2

(12) United States Patent
Li et al.

(10) Patent No.: US 12,594,529 B2
(45) Date of Patent: Apr. 7, 2026

(54) PREPARATION METHOD OF Ti₃C₂Tₓ MXENE QUANTUM DOT (MQD)-MODIFIED POLYAMIDE (PA) REVERSE-OSMOSIS (RO) MEMBRANE

(71) Applicant: Research Institute of Chemical Defense, PLA Academy of Military Sciences, Beijing (CN)

(72) Inventors: Zhanguo Li, Beijing (CN); Jun Li, Beijing (CN); Yi Wang, Beijing (CN); Yong Pan, Beijing (CN); Jian Li, Beijing (CN)

(73) Assignee: Research Institute of Chemical Defense, PLA Academy of Military Sciences, Beijing (CN)

( * ) Notice: Subject to any disclaimer, the term of this patent is extended or adjusted under 35 U.S.C. 154(b) by 99 days.

(21) Appl. No.: 18/512,011

(22) Filed: Nov. 16, 2023

(65) Prior Publication Data

US 2024/0207793 A1 Jun. 27, 2024

(30) Foreign Application Priority Data

Dec. 21, 2022 (CN) .......................... 202211650872.3

(51) Int. Cl.
B01D 69/12 (2006.01)
B01D 61/02 (2006.01)
(Continued)

(52) U.S. Cl.
CPC .... B01D 69/1251 (2022.08); B01D 69/14111 (2022.08); B01D 71/02 (2013.01);
(Continued)

(58) Field of Classification Search
CPC ............................ B01D 69/1251; B01D 71/56
See application file for complete search history.

(56) References Cited

U.S. PATENT DOCUMENTS 12,036,541 B2 * 7/2024 Park ........................ B01J 37/343

FOREIGN PATENT DOCUMENTS

CN 113600013 A 11/2021

OTHER PUBLICATIONS

Wang et al, Wang Novel thin-film reverse osmosis membrane with MXene Ti3C2Tx embedded in polyamide to enhance the water flux, anti-fouling and chlorine resistance for water desalination, Journal of Membrane Science 603 (2020) 118036.*

(Continued)

*Primary Examiner* — Alex A Rolland

(57) ABSTRACT

The present disclosure belongs to the technical field of membrane separation, and discloses a preparation method of a $Ti_3C_2T_x$ MXene quantum dot (MQD)-modified polyamide (PA) reverse osmosis (RO) membrane. The preparation method includes the following steps: subjecting a $Ti_3C_2T_x$ MXene material to liquid nitrogen intercalation and inter-layer expansion to obtain a $Ti_3C_2T_x$ MQD nanomaterial; preparing an aqueous phase solution with the $Ti_3C_2T_x$ MQD nanomaterial and an organic phase solution; soaking an ultrafiltration (UF) base membrane in the aqueous phase solution, and removing the aqueous phase solution on a surface of the UF base membrane through blow-drying; soaking the second UF base membrane in the organic phase solution to allow interfacial polymerization to form an active layer; and allowing a composite membrane obtained after the interfacial polymerization to stand, followed by a heat treatment to further promote the interfacial polymerization.

8 Claims, 7 Drawing Sheets

(51) Int. Cl.

| | |
|---|---|
| *B01D 69/14* | (2006.01) |
| *B01D 71/02* | (2006.01) |
| *B01D 71/56* | (2006.01) |
| *C01B 32/907* | (2017.01) |
| *C08G 69/04* | (2006.01) |
| *C08G 69/32* | (2006.01) |
| *C08K 3/14* | (2006.01) |

(52) U.S. Cl.
CPC ............ *B01D 71/56* (2013.01); *C01B 32/907* (2017.08); *C08G 69/04* (2013.01); *C08G 69/32* (2013.01); *C08K 3/14* (2013.01); *B01D 61/025* (2013.01); *B01D 2323/081* (2022.08); *B01D 2323/082* (2022.08); *B01D 2323/12* (2013.01); *C01P 2004/64* (2013.01); *C08K 2201/011* (2013.01)

(56) References Cited

OTHER PUBLICATIONS

Tao et al, Recent advances in exfoliation techniques of layered and non-layered materials for energy conversion and storage, J. Mater. Chem. A, Jul. 2019, 23512.*

Xiaoying Wang et al., Novel thin-film reverse osmosis membrane with MXene Ti3C2Tx embedded in polyamide to enhance the water flux, anti-fouling and chlorine resistance for water desalination, Journal of Membrane Science, Mar. 12, 2020, pp. 1-12, vol. 603.

* cited by examiner

PREPARATION METHOD OF $Ti_3C_2T_X$ MXENE QUANTUM DOT (MQD)-MODIFIED POLYAMIDE (PA) REVERSE-OSMOSIS (RO) MEMBRANE

CROSS-REFERENCE TO RELATED APPLICATION

The present application claims priority from Chinese Patent Application No. 202211650872.3 filed on Dec. 21, 2022, the contents of which are incorporated herein by reference in their entirety.

TECHNICAL FIELD

The present disclosure belongs to the technical field of membrane separation, and relates to a preparation method of a $Ti_3C_2T_x$ MXene quantum dot (MQD)-modified polyamide (PA) reverse osmosis (RO) membrane. The $Ti_3C_2T_x$ MQD-modified PA RO membrane can be used in fields such as seawater desalination, wastewater treatment, or radioactive wastewater treatment.

BACKGROUND

Nearly half of the world's population is threatened by water scarcity, and it is expected that another quarter of the world's population will be affected by water scarcity in the next 25 years. The shortage of freshwater will also lead to other crises. There is an acute shortage of water in China. The per capita water resource in China is merely 1/4 of the world's average and 1/5 of the United States' average, and ranks 110th in the world. Facing water scarcity, it is an important solution to acquire freshwater resources from seawater and brackish water. As a result, the permeable membrane separation technology will play an increasingly important role. The RO membrane technology has grown vigorously, and exhibits great advantages in seawater desalination, brackish water desalination, and pure water/ultrapure water (UPW) production. In recent years, the cost of an RO membrane had continued to decrease with the development of the RO membrane technology, and the RO membrane technology has become a seawater desalination technology that is most widely used worldwide. Currently, most of the mainstream PA RO membranes on the RO membrane market are obtained through interfacial polymerization of m-phenylenediamine (MPD) dissolved in an aqueous phase and 1,3,5-benzenetricarbonyl trichloride dissolved in an organic phase at a surface of an ultrafiltration (UF) base membrane. Due to insufficient hydrophilicity of a PA material, water flux of the PA material is restricted to some extent, which will limit the efficiency of an RO membrane. In addition, because a PA RO membrane has insufficient hydrophilicity, a membrane material is easily contaminated, which will increase the operating cost of an RO process. Therefore, it is necessary to develop a method for improving both water flux performance and anti-fouling performance of a PA membrane material.

In 2011, Gogotsi and Barsoum discovered a novel two-dimensional (2D) material, namely, a transition metal carbide/nitride MXene. A precursor of the novel 2D material is a layered metal ceramic $M_{m+1}AX_n$ phase (MAX phase), where n is generally 1 to 3, M is usually a transition metal, A is an element of the main group III or IV, and X is a carbon or nitrogen atom. There is a large MXene family, and more than 70 members have been reported. Novel materials represented by $Ti_3C_2T_x$ MXene have attracted great attention from researchers due to their excellent hydrophilicity and irradiation resistance, and have been widely used in the research on modification of membrane materials.

Xiaoying Wang et al. improved water flux of an RO membrane from about 27.2 $Lm^{31\ 2}\cdot h^{-1}$ to 40.5 $Lm^{-2}\cdot h^{-1}$ by introducing $Ti_3C_2T_x$ MXene into a PA RO membrane, and the water flux of the RO membrane decreases merely by 11.1% within 6 h under 60 ppm bovine serum albumin (BSA) contamination (Xiaoying Wang, Qingqing Li, Jianfeng Zhang, Haimeng Huang, Shaoyu Wu, Yan Yang. *Journal of Membrane Science, 2020, 603*: 118036). Chinese patent CN 113600013 A discloses a high-flux $Ti_3C_2T_x$ MXene/cellulose nanofiber-PA RO composite membrane, and a preparation method thereof. In this patent, a $Ti_3C_2T_x$ MXene/cellulose nanomaterial is used to modify a PA RO membrane, such that water flux of the PA RO membrane under a pressure of 1.6 Mpa increases to 70 $Lm^{-2}\cdot h^{-1}$.

The above findings show that the introduction of a $Ti_3C_2T_x$ MXene nanomaterial has a considerable improvement effect on separation performance of an RO membrane. However, the agglomeration of $Ti_3C_2T_x$ MXene nanomaterials limits the further effective improvement of water flux of an RO membrane. Therefore, how to improve the dispersion of a $Ti_3C_2T_x$ MXene nanomaterial and overcome its self-agglomeration to further acquire a high water flux and anti-fouling performance has become an important research direction for RO membranes.

SUMMARY (1) Objective

The objective of the present disclosure is to provide a preparation method of a $Ti_3C_2T_x$ MQD-modified PA RO membrane with a high water flux and strong anti-fouling performance in view of the problem that the existing RO membranes have an insufficient water flux and poor anti-fouling performance.

(2) Technical Solution

To solve the technical problem above, the present disclosure provides a preparation method of a $Ti_3C_2T_x$ MQD-modified PA RO membrane, which may comprise the following steps:

S1: subjecting a $Ti_3C_2T_x$ MXene material to liquid nitrogen intercalation and interlayer expansion to obtain a $Ti_3C_2T_x$ MQD nanomaterial;

S2: adding the $Ti_3C_2T_x$ MQD nanomaterial to an aqueous polyamine solution to obtain an aqueous phase solution;

S3: preparing an organic phase solution, wherein the organic phase solution is a polyacyl chloride solution; and S4: immersing an ultrafiltration (UF) base membrane in the aqueous phase solution, then removing the aqueous phase solution from a surface of the UF base membrane through blow-drying; immersing the UF base membrane in the organic phase solution to allow formation of an active layer on the UF base membrane through an interfacial polymerization reaction, resulting in a composite membrane; and allowing the composite membrane to stand, followed by subjecting it to a heat treatment to promote the interfacial polymerization reaction.

In some non-limiting examples, S1 may comprise:

S11: adding a $Ti_3AlC_2$ powder to an HF solution, and stirring a resulting mixture at 30° C. to 50° C. for 48 h to 72 h to perform etching and to obtain an etched powder; washing the etched powder repeatedly with deionized water and absolute ethanol until a pH of a resulting washing solution is higher than 6.5; and lyophilizing the resulting washing solution by conducting vacuum-drying at −70° C. to −90° C. for 12 h to 36 h to obtain the $Ti_3C_2T_x$ MXene material powder; and S12: adding 1 g to 10 g of the $Ti_3C_2T_x$ MXene material powder obtained in S11 to a polytetrafluoroethylene (PTFE) beaker, pouring 10 mL to 50 mL of liquid nitrogen into the beaker, and placing the beaker at room temperature for 3 min to 10 min; adding 30 mL to 50 mL of deionized water at 80° C. to 100° C. to the beaker to react for 3 min to 5 min, and stirring a resulting reaction mixture at room temperature for 24 h to 36 h; filtering the reaction mixture through a filter membrane with a pore size of 220 nm, and centrifuging a resulting filtrate at 10,000 r/min for 10 min to 30 min to obtain a $Ti_3C_2T_x$ MQD solution; and lyophilizing the $Ti_3C_2T_x$ MQD solution for 24 h to 48 h to obtain the $Ti_3C_2T_x$ MQD nanomaterial.

In some non-limiting examples, in S2, a preparation process of the aqueous phase solution may be as follows: dissolving a polyamine in deionized water, adding the $Ti_3C_2T_x$ MQD nanomaterial, and thoroughly stirring a resulting mixture.

In some non-limiting examples, in S3, a preparation process of the organic phase solution may be as follows: adding a polyacyl chloride to an organic solvent, and thoroughly stirring a resulting mixture.

In some non-limiting examples, S4 may comprise: immersing the UF base membrane in the aqueous phase solution for 2 min to 20 min, and removing the aqueous phase solution from the surface of the UF base membrane through blow-drying with an air knife; immersing the UF base membrane in the organic phase solution for 2 s to 200 s to allow formation of the active layer through the interfacial polymerization reaction; and placing the composite membrane vertically for 50 s to 100 s, followed by subjecting the composite membrane to the heat treatment for 8 min to 20 min in an oven at 40° C. to 90° C. to promote the interfacial polymerization reaction.

In some non-limiting examples, in S11, a mass percentage concentration of the HF solution may be 30% to 50%.

In some non-limiting examples, in S1, the $Ti_3C_2T_x$ MXene material powder may have a particle size of 2 nm to 50 nm, and the $Ti_3C_2T_x$ MQD nanomaterial may have a thickness of 1 nm to 20 nm.

In some non-limiting example, in S2, a polyamine may be at least one selected from the group consisting of m-phenylenediamine (MPD), o-phenylenediamine (OPD), p-phenylenediamine (PPD), m-xylylenediamine (MXD), N,N-dimethylphenylenediamine, and 4-methyl-m-phenylenediamine; a mass percentage concentration of the polyamine may be 0.1% to 5%, and a mass percentage concentration of the $Ti_3C_2T_x$ MQD nanomaterial may be 0.001% to 0.1%.

In some non-limiting examples, in S3, the polyacyl chloride may be at least one selected from the group consisting of 1,3,5-benzenetricarbonyl trichloride, phthaloyl chloride, isophthaloyl chloride (IPC), 1,3,5-cyclohexanetricarbonyl chloride, and methyl m-phenylene diisocyanate; and a mass percentage concentration of the polyacyl chloride may be 0.01% to 2.5%.

(3) Beneficial Effects

In the preparation method of a $Ti_3C_2T_x$ MQD-modified PA RO membrane provided in the above technical solution, a $Ti_3C_2T_x$ MQD nanomaterial is prepared through "micro-explosion" to improve the dispersion, surface hydrophilicity, and surface electronegativity of a $Ti_3C_2T_x$ MXene material, which can effectively increase the water flux and anti-fouling performance of a PA RO membrane on the basis of ensuring a salt rejection of the membrane, thereby allowing the structural controllability of the RO membrane. A $Ti_3C_2T_x$ MQD-modified PA RO membrane prepared by the preparation method has advantages such as high salt rejection, high water flux, and high anti-fouling performance, and is of great practical significance for the use of high-performance RO membranes in fields such as seawater desalination, wastewater treatment, or radioactive wastewater treatment.

DETAILED DESCRIPTION

In order to make the objective, content, and advantages of the present disclosure clear, specific implementations of the present disclosure will be further described in detail below with reference to the accompanying drawings and examples.

Example 1

A preparation method of a $Ti_3C_2T_x$ MQD-modified PA RO membrane was provided, specifically including the following steps:

(1) 10.0 g of a $Ti_3AlC_2$ powder was added to an HF solution with a mass concentration of 40%, and a resulting mixture was stirred for 72 h at 35° C. to allow etching to obtain an etched powder; the etched powder was washed repeatedly with deionized water and absolute ethanol 4 times until a pH of a resulting washing solution was 6.8; and the resulting washing solution was lyophilized and then vacuum-dried at −90° C. for 24 h to obtain a $Ti_3C_2T_x$ MXene material powder.

Figure 3:
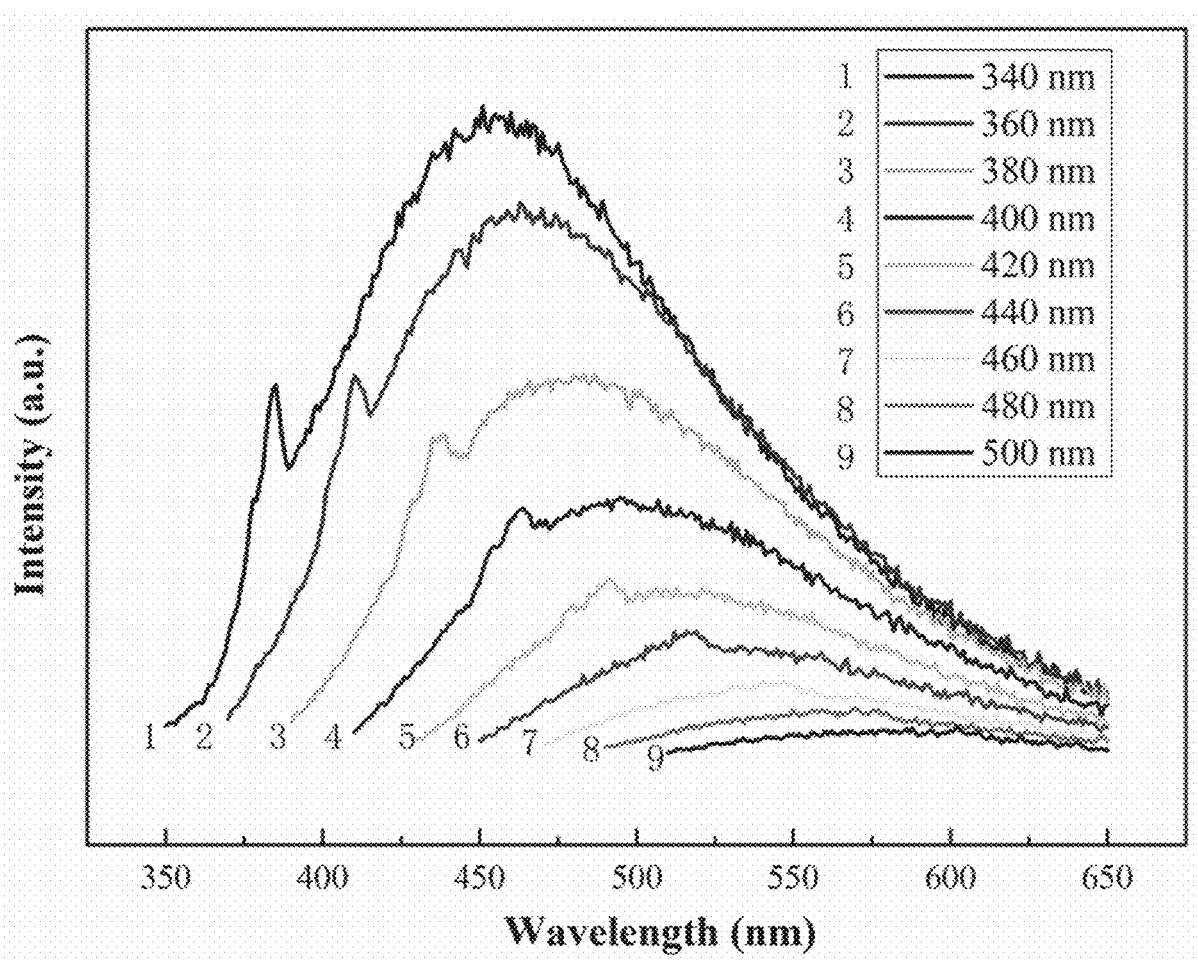
FIG. 3 shows a photoluminescence spectrum of the $Ti_3C_2T_x$ MQD obtained in step 2 in Example 1 of the present disclosure under excitation at 340 nm to 500 nm.

(2) 5.0 g of the $Ti_3C_2T_x$ MXene material powder obtained in step (1) was added to a PTFE beaker, 20 mL of liquid nitrogen was poured into the beaker, and the beaker was placed at room temperature for 5 min; 30 mL of deionized water at 95° C. was added to the beaker, a reaction was conducted for 4 min, and a resulting reaction mixture was stirred at room temperature for 24 h and then filtered through a filter membrane with a pore size of 220 nm; and a resulting filtrate was centrifuged at 10,000 r/min for 20 min to obtain a $Ti_3C_2T_x$ MQD solution, and the $Ti_3C_2T_x$ MQD solution was lyophilized for 48 h to obtain a $Ti_3C_2T_x$ MQD nanomaterial powder. Photoluminescence spectrum of the $Ti_3C_2T_x$ MQD under excitation at 340 nm to 500 nm is shown in FIG. 3.

(3) The powder obtained in step (2) was dissolved at a mass concentration of 0.001% in an MPD aqueous solution with a mass concentration of 3.0% to obtain an aqueous phase solution, then 100 mL of the aqueous phase solution was poured onto a surface of a first UF base membrane to allow soaking for 5 min, and then the aqueous phase solution on the surface of the first UF base membrane was removed through blow-drying with an air knife, to obtain a second UF base membrane.

(4) The second UF base membrane was soaked in a 1,3,5-benzenetricarbonyl trichloride organic phase solution with a mass percentage concentration of 0.15% for 60 s to allow interfacial polymerization to form an active layer; and a composite membrane obtained after the interfacial polymerization was placed vertically for 60 s, and then subjected to a heat treatment for 8 min in an oven at 90° C. to further promote the interfacial polymerization to obtain the $Ti_3C_2T_x$ MQD-modified PA RO membrane.

The prepared sample was subjected to SEM analysis, and tested for water flux performance, salt retention performance, and anti-fouling performance. A specific test process was as follows: water flux and salt rejection of the composite membrane when treating a 2,000 ppm NaCl solution as a feed at a temperature of 25±0.1° C., a flow rate of 0.19 m/s, and a pressure of 225 psi (1.55 MPa) were tested. The water flux is defined as $Q=J/(A·t)$, where J represents a permeated water amount (L), Q represents water flux (L/m²·h), A represents an effective membrane area of an RO membrane (m²), and t represents a time (h). The salt rejection is defined as $R=(C_p-C_f)/C_p\times100\%$, where $C_p$ represents a concentration of NaCl in an original solution and $C_f$ represents a concentration of NaCl in a permeate solution. The anti-biological fouling performance of the composite PA RO membrane was tested with an Escherichia coli (*E. coli*) cell dilution as a contaminant. The composite PA RO membrane was placed in an *E. coli* cell solution with a concentration of $1.7\times10^7$/mL and incubated in an incubator at 30° C. to allow soaking under ultraviolet (UV) light for 4 h, and the soaking operation was conducted for 1 d, 2 d, and 3 d; and after the soaking every day, a contaminated composite PA RO membrane was used to treat a 2,000 ppm NaCl solution as a feed, and corresponding water fluxes $Q_{d1}$, $Q_{d2}$, and $Q_{d3}$ were determined. The anti-biological fouling performance of the composite PA RO membrane was measured by a decrease in water flux performance. The feed was replaced by a mixed aqueous solution of NaCl and BSA (in which a concentration of NaCl was 2,000 ppm and a concentration of BSA was 1,000 ppm), and the anti-organic fouling performance of the composite PA RO membrane was tested by calculating a recovery rate of relative water flux. A 2,000 ppm NaCl solution alone was used as a feed to test the separation performance of the composite PA RO membrane for 6 h under a pressure of 1.5 MPa, and a corresponding water flux was determined and denoted as $Q_0$; then a BSA-containing mixed solution was used a feed to test the separation performance of the composite PA RO membrane for 6 h under the same conditions, and a corresponding water flux was determined and denoted as $Q_t$; and then the composite PA RO membrane was thoroughly cleaned with deionized water for 0.5 h. The above test process was set as a cycle, and three cycles were conducted in total; and then a recovery rate of relative water flux was calculated as follows: $Q_r=Q_t/Q_0\times100\%$.

Example 2

A preparation method of a $Ti_3C_2T_x$ MQD-modified PA RO membrane was provided, specifically including the following steps:

(1) 10.0 g of a $Ti_3AlC_2$ powder was added to an HF solution with a mass concentration of 40%, and a resulting mixture was stirred for 72 h at 35° C. to allow etching to obtain an etched powder; the etched powder was washed repeatedly with deionized water and absolute ethanol 4 times until a pH of a resulting washing solution was 6.8; and the resulting washing solution was lyophilized and then vacuum-dried at −90° C. for 24 h to obtain a $Ti_3C_2T_x$ MXene material powder.

(2) 5.0 g of the $Ti_3C_2T_x$ MXene material powder obtained in step (1) was added to a PTFE beaker, 20 mL of liquid nitrogen was poured into the beaker, and the beaker was placed at room temperature for 5 min; 30 mL of deionized water at 95° C. was added to the beaker, a reaction was conducted for 4 min, and a resulting reaction mixture was stirred at room temperature for 24 h and then filtered through a filter membrane with a pore size of 220 nm; and a resulting filtrate was centrifuged at 10,000 r/min for 20 min to obtain a $Ti_3C_2T_x$ MQD solution, and the $Ti_3C_2T_x$ MQD solution was lyophilized for 48 h to obtain a $Ti_3C_2T_x$ MQD nano-material powder.

(3) The powder obtained in step (2) was dissolved at a mass concentration of 0.005% in an MPD aqueous solution with a mass concentration of 3.0% to obtain an aqueous phase solution, then 100 mL of the aqueous phase solution was poured onto a surface of a first UF base membrane to allow soaking for 5 min, and then the aqueous phase solution on the surface of the first UF base membrane was removed through blow-drying with an air knife, to obtain a second UF base membrane.

(4) The second UF base membrane was soaked in a 1,3,5-benzenetricarbonyl trichloride organic phase solution with a mass percentage concentration of 0.15% for 60 s to allow interfacial polymerization to form an active layer; and a composite membrane obtained after the interfacial polymerization was placed vertically for 60 s, and then subjected to a heat treatment for 8 min in an oven at 90° C. to further promote the interfacial polymerization to obtain the $Ti_3C_2T_x$ MQD-modified PA RO membrane. The prepared sample was subjected to SEM analysis, and tested for water flux performance, salt retention performance, and anti-fouling performance. Specific test processes were consistent with those in Example 1.

Example 3

A preparation method of a $Ti_3C_2T_x$ MQD-modified PA RO membrane was provided, specifically including the following steps:

(1) 10.0 g of a $Ti_3AlC_2$ powder was added to an HF solution with a mass concentration of 40%, and a resulting mixture was stirred for 72 h at 35° C. to allow etching to obtain an etched powder; the etched powder was washed repeatedly with deionized water and absolute ethanol 4 times until a pH of a resulting washing solution was 6.8; and the resulting washing solution was lyophilized and then vacuum-dried at −90° C. for 24 h to obtain a $Ti_3C_2T_x$ MXene material powder.

(2) 5.0 g of the $Ti_3C_2T_x$ MXene material powder obtained in step (1) was added to a PTFE beaker, 20 mL of liquid nitrogen was poured into the beaker, and the beaker was placed at room temperature for 5 min; 30 mL of deionized water at 95° C. was added to the beaker, a reaction was conducted for 4 min, and a resulting reaction mixture was stirred at room temperature for 24 h and then filtered through a filter membrane with a pore size of 220 nm; and a resulting filtrate was centrifuged at 10,000 r/min for 20 min to obtain a $Ti_3C_2T_x$ MQD solution, and the $Ti_3C_2T_x$ MQD solution was lyophilized for 48 h to obtain a $Ti_3C_2T_x$ MQD nano-material powder.

(3) The powder obtained in step (2) was dissolved at a mass concentration of 0.010% in an MPD aqueous solution with a mass concentration of 3.0% to obtain an aqueous phase solution, then 100 mL of the aqueous phase solution was poured onto a surface of a first UF base membrane to allow soaking for 5 min, and then the aqueous phase solution on the surface of the first UF base membrane was removed through blow-drying with an air knife, to obtain a second UF base membrane.

Figure 1A:
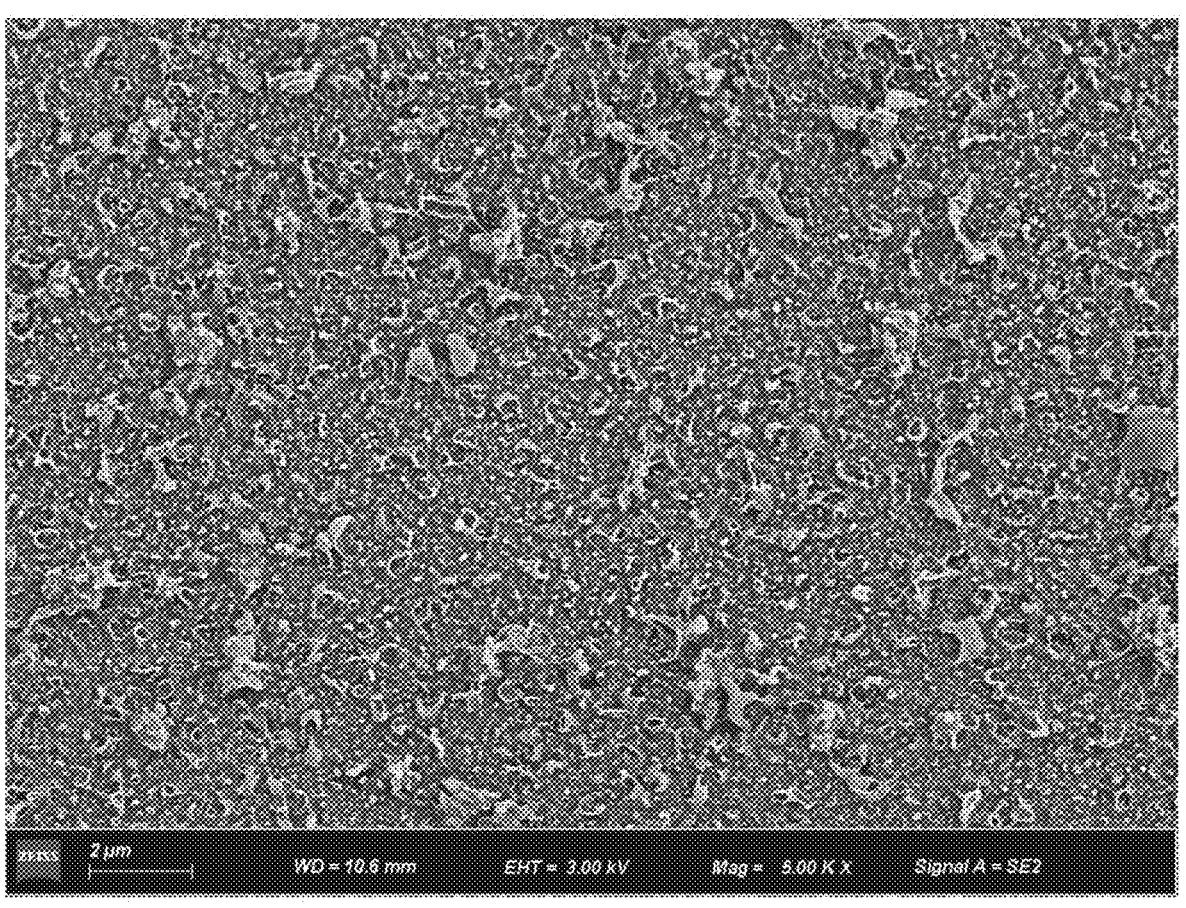
FIG. 1(*a*) is a scanning electron microscopy (SEM) image of a surface of the RO composite membrane prepared in Comparative Example 1 of the present disclosure, FIG. 1(*b*) is an SEM image of a surface of the RO composite membrane prepared in Comparative Example 2 of the present disclosure, and FIG. 1(*c*) is an SEM image of a surface of the RO composite membrane prepared in Example 3 of the present disclosure.
Figure 1B:
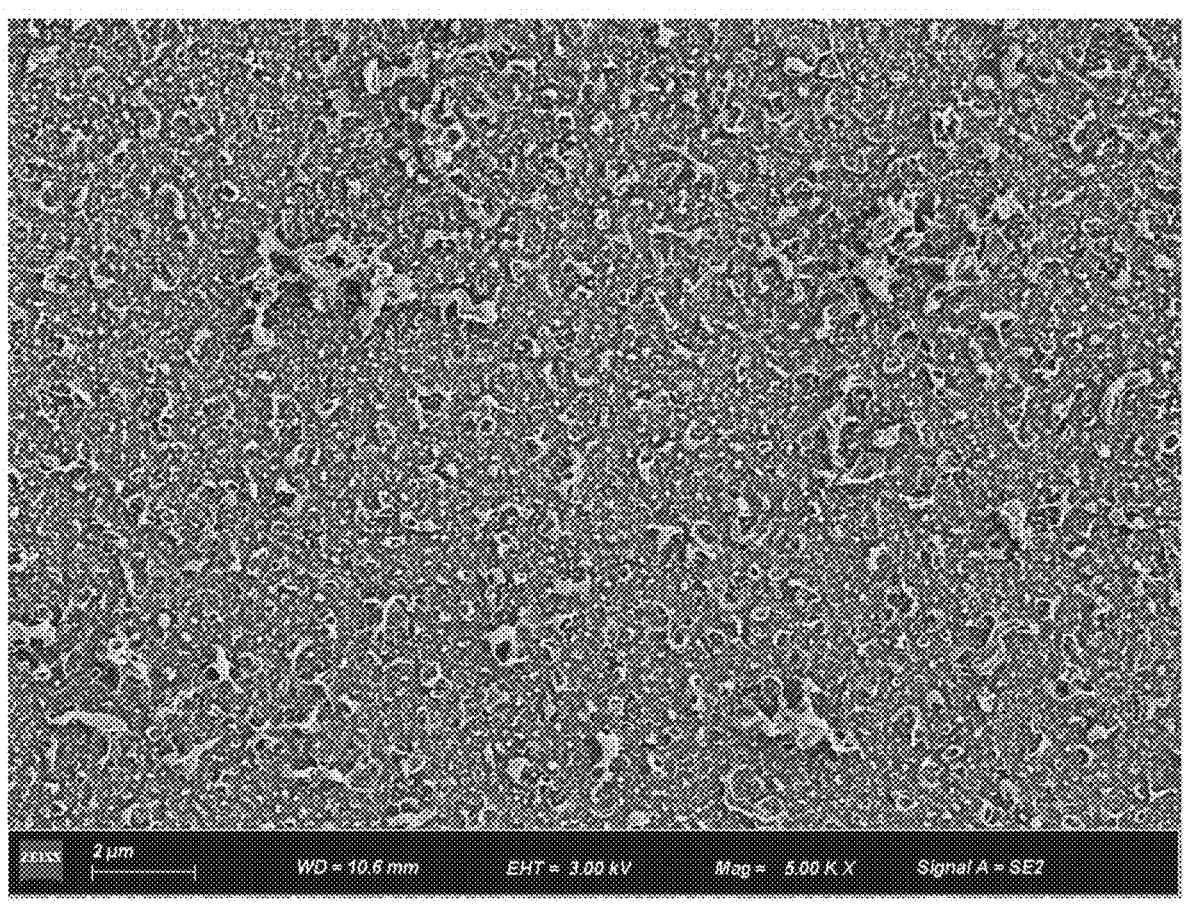
Figure 1C:
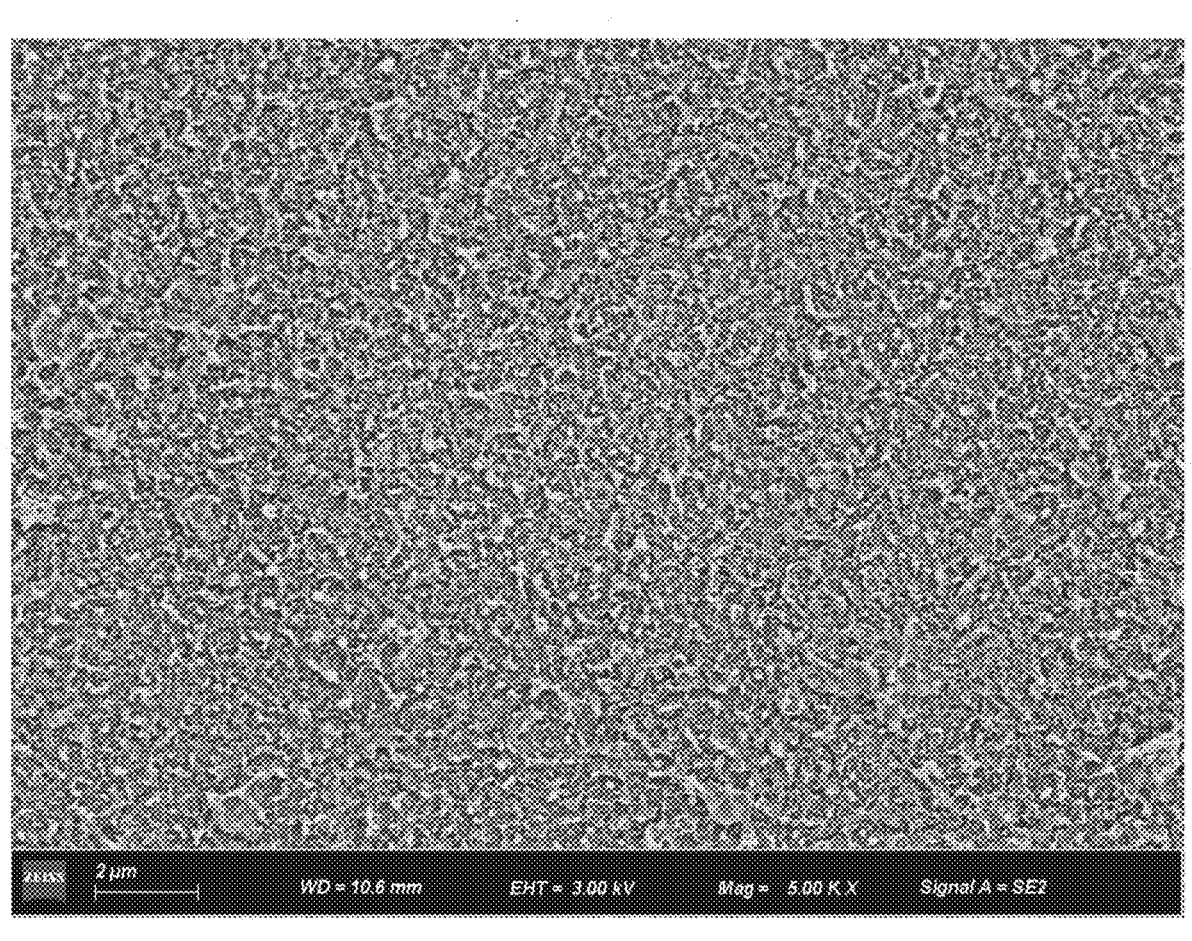
Figure 2A:
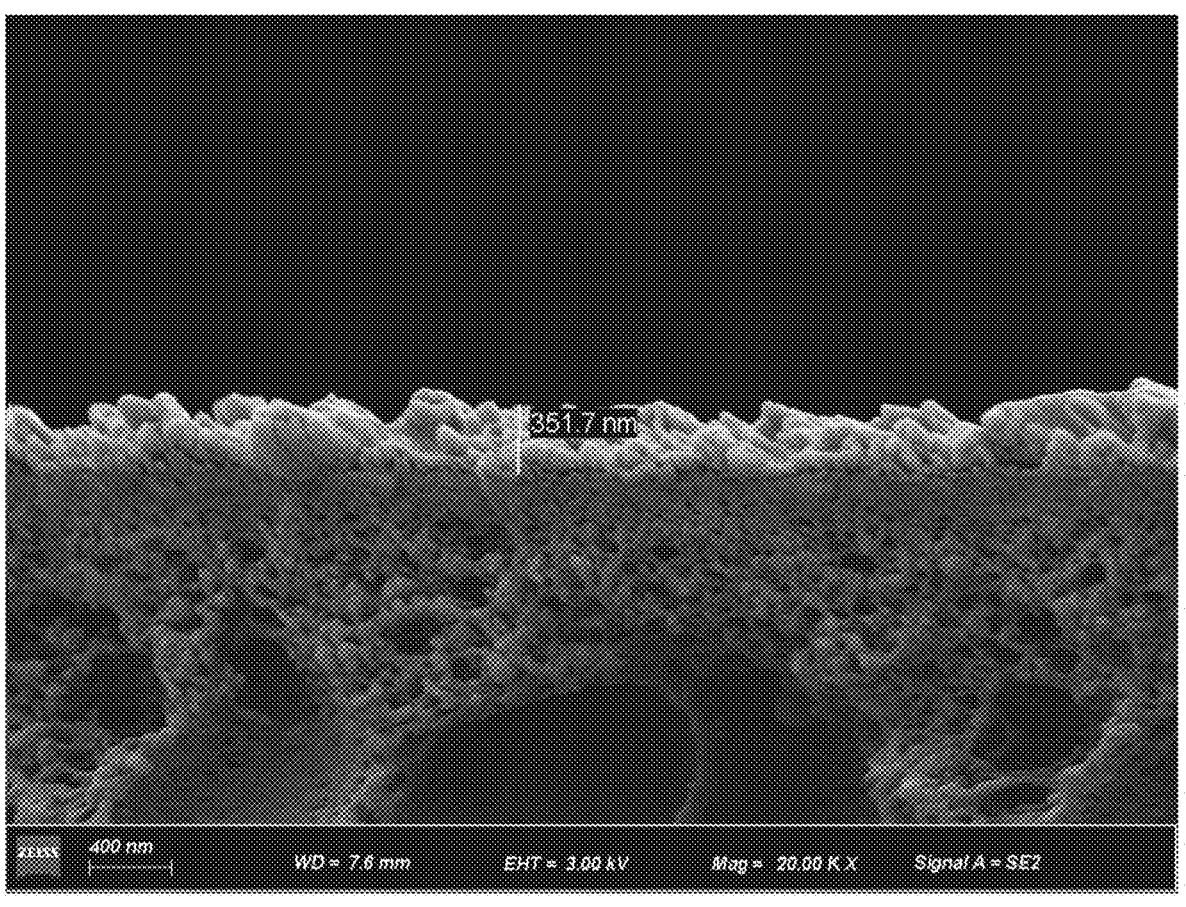
FIG. 2(*a*) is an SEM image of a cross-section of the RO composite membrane prepared in Comparative Example 1 of the present disclosure, FIG. 2(*b*) is an SEM image of a cross-section of the RO composite membrane prepared in Comparative Example 2 of the present disclosure, and FIG. 2(*c*) is an SEM image of a cross-section of the RO composite membrane prepared in Example 3 of the present disclosure.
Figure 2B:
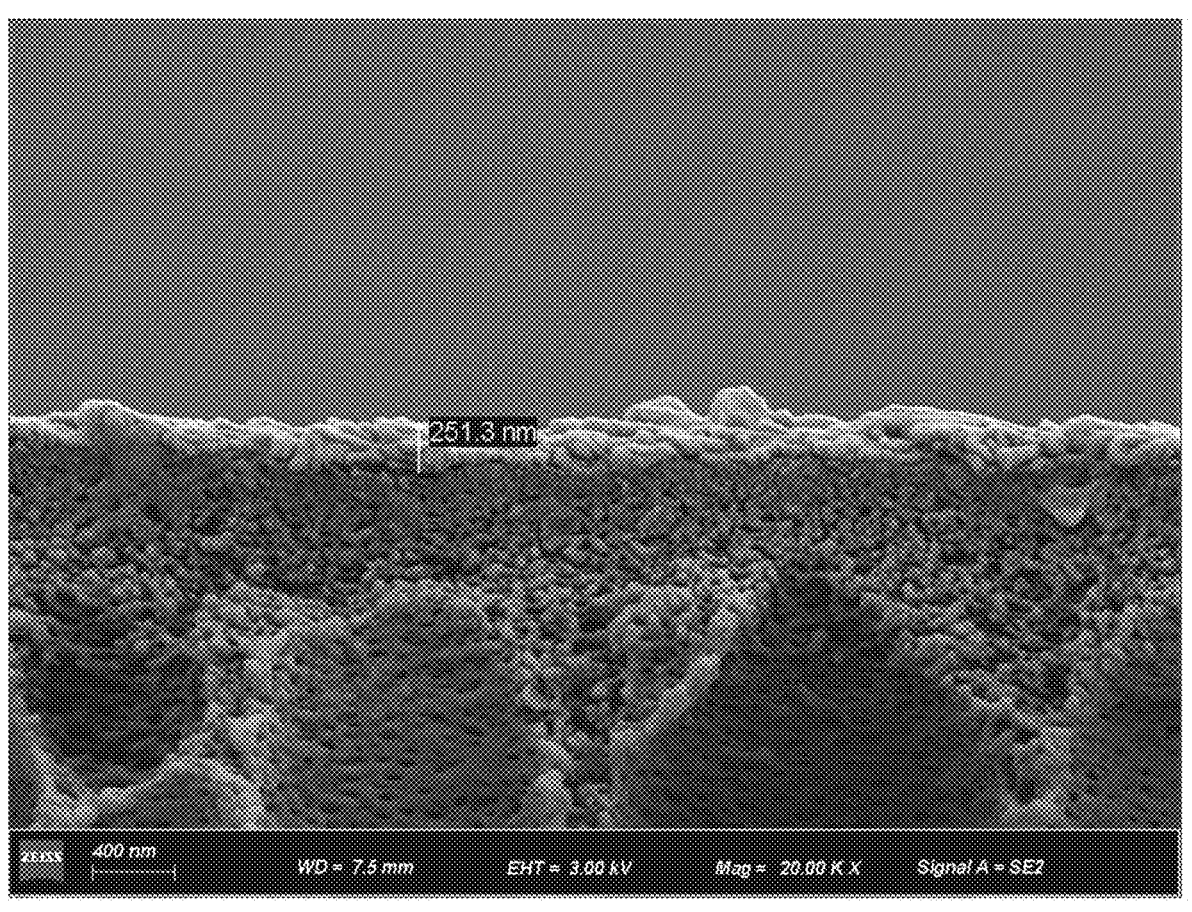
Figure 2C:
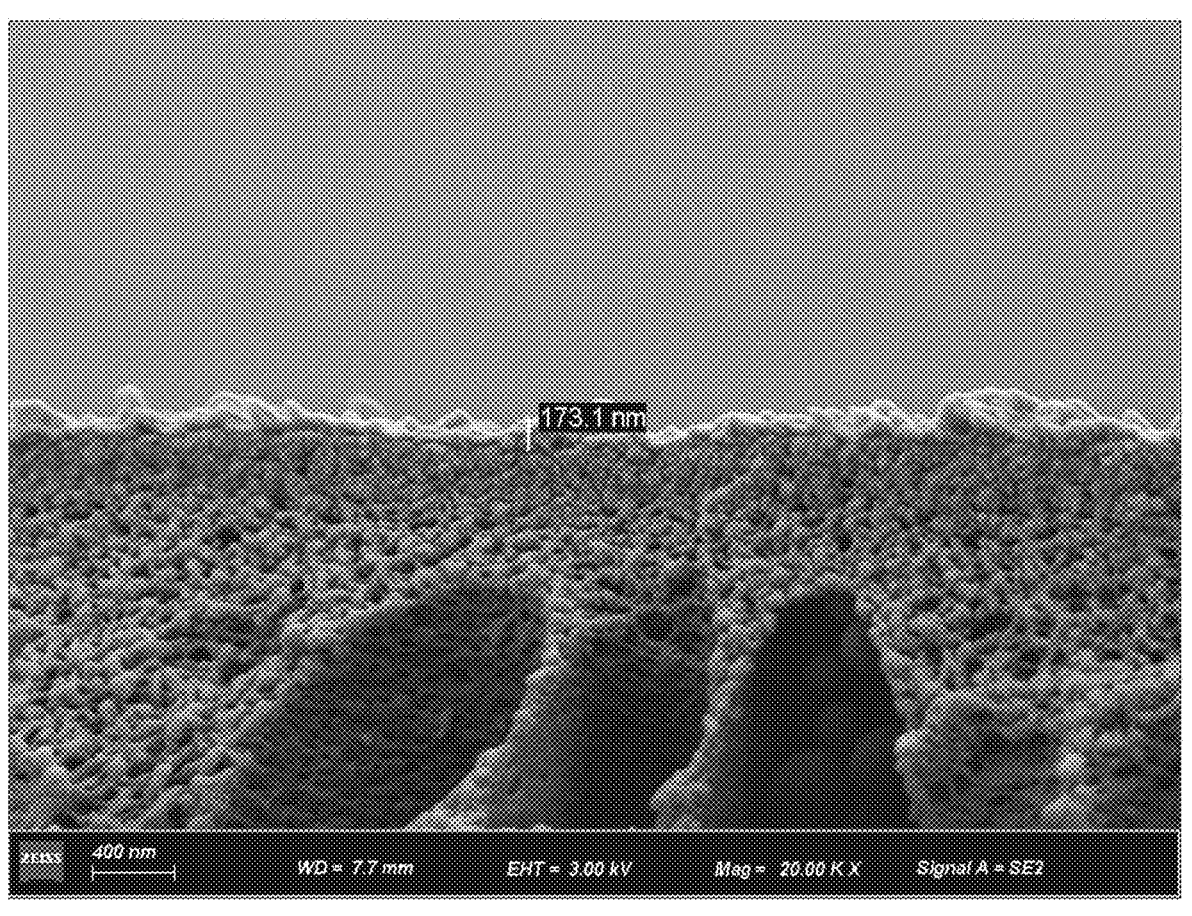

(4) The second UF base membrane was soaked in a 1,3,5-benzenetricarbonyl trichloride organic phase solution with a mass percentage concentration of 0.15% for 60 s to allow interfacial polymerization to form an active layer; and a composite membrane obtained after the interfacial polymerization was placed vertically for 60 s, and then subjected to a heat treatment for 8 min in an oven at 90° C. to further promote the interfacial polymerization to obtain the $Ti_3C_2T_x$ MQD-modified PA RO membrane. The prepared sample was subjected to SEM analysis, and tested for water flux performance, salt retention performance, and anti-fouling performance. Specific test processes were consistent with those in Example 1. An SEM image of a surface of the RO composite membrane prepared in Example 3 is shown in FIG. 1(c), and an SEM image of a cross-section of the RO composite membrane is shown in FIG. 2(c).

Example 4

A preparation method of a $Ti_3C_2T_x$ MQD-modified PA RO membrane was provided, specifically including the following steps:

(1) 10.0 g of a $Ti_3AlC_2$ powder was added to an HF solution with a mass concentration of 40%, and a resulting mixture was stirred for 72 h at 35° C. to allow etching to obtain an etched powder; the etched powder was washed repeatedly with deionized water and absolute ethanol 4 times until a pH of a resulting washing solution was 6.8; and the resulting washing solution was lyophilized and then vacuum-dried at −90° C. for 24 h to obtain a $Ti_3C_2T_x$ MXene material powder.

(2) 5.0 g of the $Ti_3C_2T_x$ MXene material powder obtained in step (1) was added to a PTFE beaker, 20 mL of liquid nitrogen was poured into the beaker, and the beaker was placed at room temperature for 5 min; 30 mL of deionized water at 95° C. was added to the beaker, a reaction was conducted for 4 min, and a resulting reaction mixture was stirred at room temperature for 24 h and then filtered through a filter membrane with a pore size of 220 nm; and a resulting filtrate was centrifuged at 10,000 r/min for 20 min to obtain a $Ti_3C_2T_x$ MQD solution, and the $Ti_3C_2T_x$ MQD solution was lyophilized for 48 h to obtain a $Ti_3C_2T_x$ MQD nano-material powder.

(3) The powder obtained in step (2) was dissolved at a mass concentration of 0.050% in an MPD solution with a mass concentration of 3.0% to obtain an aqueous phase solution, then 100 mL of the aqueous phase solution was poured onto a surface of a first UF base membrane to allow soaking for 5 min, and then the aqueous phase solution on the surface of the first UF base membrane was removed through blow-drying with an air knife, to obtain a second UF base membrane.

(4) The second UF base membrane was soaked in a 1,3,5-benzenetricarbonyl trichloride organic phase solution with a mass percentage concentration of 0.15% for 60 s to allow interfacial polymerization to form an active layer; and a composite membrane obtained after the interfacial polymerization was placed vertically for 60 s, and then subjected to a heat treatment for 8 min in an oven at 90° C. to further promote the interfacial polymerization to obtain the $Ti_3C_2T_x$ MQD-modified PA RO membrane. The prepared sample was subjected to SEM analysis, and tested for water flux performance, salt retention performance, and anti-fouling performance. Specific test processes were consistent with those in Example 1.

Example 5

A preparation method of a $Ti_3C_2T_x$ MQD-modified PA RO membrane was provided, specifically including the following steps:

(1) 10.0 g of a $Ti_3AlC_2$ powder was added to an HF solution with a concentration of 40%, and a resulting mixture was stirred for 72 h at 35° C. to allow etching to obtain an etched powder; the etched powder was washed repeatedly with deionized water and absolute ethanol 4 times until a pH of a resulting washing solution was 6.8; and the resulting washing solution was lyophilized and then vacuum-dried at −90° C. for 24 h to obtain a $Ti_3C_2T_x$ MXene material powder.

(2) 5.0 g of the $Ti_3C_2T_x$ MXene material powder obtained in step (1) was added to a PTFE beaker, 20 mL of liquid nitrogen was poured into the beaker, and the beaker was placed at room temperature for 5 min; 30 mL of deionized water at 95° C. was added to the beaker, a reaction was conducted for 4 min, and a resulting reaction mixture was stirred at room temperature for 24 h and then filtered through a filter membrane with a pore size of 220 nm; and a resulting filtrate was centrifuged at 10,000 r/min for 20 min to obtain a $Ti_3C_2T_x$ MQD solution, and the $Ti_3C_2T_x$ MQD solution was lyophilized for 48 h to obtain a $Ti_3C_2T_x$ MQD nano-material powder.

(3) The powder obtained in step (2) was dissolved at a mass concentration of 0.10% in an MPD aqueous solution with a mass concentration of 3.0% to obtain an aqueous phase solution, then 100 mL of the aqueous phase solution was poured onto a surface of a first UF base membrane to allow soaking for 5 min, and then the aqueous phase solution on the surface of the first UF base membrane was removed through blow-drying with an air knife, to obtain a second UF base membrane.

(4) The second UF base membrane was soaked in a 1,3,5-benzenetricarbonyl trichloride organic phase solution with a mass percentage concentration of 0.15% for 60 s to allow interfacial polymerization to form an active layer; and a composite membrane obtained after the interfacial polym-erization was placed vertically for 60 s, and then subjected to a heat treatment for 8 min in an oven at 90° C. to further promote the interfacial polymerization to obtain the $Ti_3C_2T_x$ MQD-modified PA RO membrane. The prepared sample was subjected to SEM analysis, and tested for water flux performance, salt retention performance, and anti-fouling performance. Specific test processes were consistent with those in Example 1.

Example 6

A preparation method of a $Ti_3C_2T_x$ MQD-modified PA RO membrane was provided, specifically including the following steps:

(1) 10.0 g of a $Ti_3AlC_2$ powder was added to an HF solution with a mass concentration of 40%, and a resulting mixture was stirred for 72 h at 35° C. to allow etching to obtain an etched powder; the etched powder was washed repeatedly with deionized water and absolute ethanol 4 times until a pH of a resulting washing solution was 6.8; and the resulting washing solution was lyophilized and then vacuum-dried at −90° C. for 24 h to obtain a $Ti_3C_2T_x$ MXene material powder.

(2) 5.0 g of the $Ti_3C_2T_x$ MXene material powder obtained in step (1) was added to a PTFE beaker, 20 mL of liquid nitrogen was poured into the beaker, and the beaker was placed at room temperature for 5 min; 30 mL of deionized water at 95° C. was added to the beaker, a reaction was conducted for 4 min, and a resulting reaction mixture was stirred at room temperature for 24 h and then filtered through a filter membrane with a pore size of 220 nm; and a resulting filtrate was centrifuged at 10,000 r/min for 20 min to obtain a $Ti_3C_2T_x$ MQD solution, and the $Ti_3C_2T_x$ MQD solution was lyophilized for 48 h to obtain a $Ti_3C_2T_x$ MQD nano-material powder.

(3) The powder obtained in step (2) was dissolved at a mass concentration of 0.010% in an OPD aqueous solution with a mass concentration of 3.0% to obtain an aqueous phase solution, then 100 mL of the aqueous phase solution was poured onto a surface of a first UF base membrane to allow soaking for 5 min, and then the aqueous phase solution on the surface of the first UF base membrane was removed through blow-drying with an air knife, to obtain a second UF base membrane.

(4) The second UF base membrane was soaked in a 1,3,5-benzenetricarbonyl trichloride organic phase solution with a mass percentage concentration of 0.15% for 60 s to allow interfacial polymerization to form an active layer; and a composite membrane obtained after the interfacial polymerization was placed vertically for 60 s, and then subjected to a heat treatment for 8 min in an oven at 90° C. to further promote the interfacial polymerization to obtain the $Ti_3C_2T_x$ MQD-modified PA RO membrane. The prepared sample was subjected to SEM analysis, and tested for water flux performance, salt retention performance, and anti-fouling performance. Specific test processes were consistent with those in Example 1.

Comparative Example 1

(1) An MPD aqueous solution with a mass concentration of 3.0% was prepared, then 100 mL of the MPD aqueous solution was poured onto a surface of a first UF base membrane to allow soaking for 5 min, and then the excess MPD aqueous solution on the surface of the first UF base membrane was removed through blow-drying with an air knife, to obtain a second UF base membrane.

(2) The second UF base membrane was soaked in a 1,3,5-benzenetricarbonyl trichloride organic phase solution with a mass percentage concentration of 0.15% for 60 s to allow interfacial polymerization to form an active layer; and a composite membrane obtained after the interfacial polymerization was placed vertically for 60 s, and then subjected to a heat treatment for 8 min in an oven at 90° C. to further promote the interfacial polymerization to obtain a PA RO membrane. The prepared sample was subjected to SEM analysis, and tested for water flux performance, salt retention performance, and anti-fouling performance. Specific test processes were consistent with those in Example 1. An SEM image of a surface of the RO composite membrane prepared in Comparative Example 1 is shown in FIG. 1(a), and an SEM image of a cross-section of the RO composite membrane is shown in FIG. 2(a).

Comparative Example 2

(1) 10.0 g of a $Ti_3AlC_2$ powder was added to an HF solution with a mass concentration of 40%, and a resulting mixture was stirred for 72 h at 35° C. to allow etching to obtain an etched powder; the etched powder was washed repeatedly with deionized water and absolute ethanol 4 times until a pH of a resulting washing solution was 6.8; and the resulting washing solution was lyophilized and then vacuum-dried at −90° C. for 24 h to obtain a $Ti_3C_2T_x$ MXene material powder.

(2) The powder obtained in step (1) was dissolved at a mass concentration of 0.010% in an MPD aqueous solution with a mass concentration of 3.0% to obtain an aqueous phase solution, then 100 mL of the aqueous phase solution was poured onto a surface of a first UF base membrane to allow soaking for 5 min, and then the aqueous phase solution on the surface of the first UF base membrane was removed through blow-drying with an air knife, to obtain a second UF base membrane.

(3) The second UF base membrane was soaked in a 1,3,5-benzenetricarbonyl trichloride organic phase solution with a mass percentage concentration of 0.15% for 60 s to allow interfacial polymerization to form an active layer; and a composite membrane obtained after the interfacial polymerization was placed vertically for 60 s, and then subjected to a heat treatment for 8 min in an oven at 90° C. to further promote the interfacial polymerization to obtain a $Ti_3C_2T_x$ MXene-modified PA RO membrane. The prepared sample was subjected to SEM analysis, and tested for water flux performance, salt retention performance, and anti-fouling performance. Specific test processes were consistent with those in Example 1. An SEM image of a surface of the RO composite membrane prepared in Comparative Example 2 is shown in FIG. 1(b), and an SEM image of a cross-section of the RO composite membrane is shown in FIG. 2(b).

Experimental Results

1. The composite PA RO membranes prepared in Examples 1 to 6 and Comparative Examples 1 and 2 each were tested by the above methods for the water flux, retention rate, and anti-fouling performance, and test results were as follows:

TABLE 1

Water fluxes, retention rates, and anti-fouling performance of different composite PA RO membranes

| No. | Water flux (LMH) | Salt rejection (%) | $Q_{d1}$ (LMH) | $Q_{d2}$ (LMH) | $Q_{d3}$ (LMH) | $Q_r$ (%) |
|---|---|---|---|---|---|---|
| Example 1 | 57.3 | 99.0 | 50.6 | 43.5 | 37.6 | 95.2 |
| Example 2 | 63.5 | 98.7 | 56.8 | 47.7 | 41.5 | 94.1 |
| Example 3 | 65.3 | 98.5 | 58.4 | 49.4 | 42.3 | 93.2 |
| Example 4 | 68.6 | 98.0 | 60.0 | 53.4 | 46.4 | 92.5 |
| Example 5 | 72.3 | 90.7 | 65.3 | 56.3 | 48.3 | 92.3 |
| Example 6 | 62.8 | 98.3 | 57.3 | 50.2 | 41.5 | 92.8 |

TABLE 1-continued

Water fluxes, retention rates, and anti-fouling performance
of different composite PA RO membranes

| No. | Water flux (LMH) | Salt rejection (%) | $Q_{d1}$ (LMH) | $Q_{d2}$ (LMH) | $Q_{d3}$ (LMH) | $Q_r$ (%) |
|---|---|---|---|---|---|---|
| Comparative Example 1 | 40.0 | 98.3 | 33.6 | 27.5 | 23.8 | 91.0 |
| Comparative Example 2 | 32.5 | 99.2 | 23.5 | 18.3 | 15.0 | 75.5 |

It can be seen from the data in the table that water fluxes of the composite membranes in Examples 1 to 6 all are significantly improved compared with water fluxes of the ordinary RO membranes in Comparative Examples 1 and 2 (32.5 LMH), while salt rejections of the composite membranes in the examples are not compromised significantly; and with the gradual increase of a concentration of the MQD, the water flux of the composite membrane increases gradually, but when the concentration of the MQD is higher than a specified value (example 5), the salt rejection of the composite membrane begins to decrease. It can be seen from the anti-fouling performance that both the anti-biological fouling performance and the anti-organic fouling performance of the composite membrane have been improved to some extent. Therefore, the composite PA RO membrane prepared by the preparation method provided in the present disclosure has a high water flux and excellent anti-fouling performance. In addition, the preparation method is simple, and has promising industrial application prospects.

According to the above-mentioned technical solutions, the present disclosure has the following distinctive features:

(1) In the present disclosure, a $Ti_3C_2T_x$ MQD is prepared by a simple low-temperature "micro-explosion" method. A principle of the low-temperature "micro-explosion" method is as follows: Based on an accordion-like microstructure of a $Ti_3C_2T_x$ MXene material, liquid nitrogen is added to allow intercalation, and then high-temperature deionized water is added to provide a temperature difference, such that liquid nitrogen expands rapidly among layers to produce a "micro-explosion" reaction. Groups on a surface of the $Ti_3C_2T_x$ MQD successfully prepared by this method can easily form hydrogen bonds with water, and thus the $Ti_3C_2T_x$ MQD has high hydrophilicity and can be well dispersed in water without stirring and an ultrasonic treatment.

(2) In the present disclosure, the $Ti_3C_2T_x$ MQD is introduced into an aqueous solution for interfacial polymerization, and then the interfacial polymerization is conducted to form a PA layer of an RO membrane, which improves the water flux and anti-fouling performance of the RO membrane while providing a new solution for further improving the dispersion of the $Ti_3C_2T_x$ MXene nanomaterial. In addition, the present disclosure further develops use of the $Ti_3C_2T_x$ MXene nanomaterial as a novel additive in improvement of performance of a PA RO membrane.

The above are preferred implementations of the present disclosure, and it should be noted that those of ordinary skill in the art can make various improvements and modifications without departing from the technical principles of the present disclosure. These improvements and modifications should be regarded as falling within the protection scope of the present disclosure.

The invention claimed is:

1. A preparation method of a $Ti_3C_2T_x$ MXene quantum dot (MQD)-modified polyamide (PA) reverse osmosis (RO)

membrane, wherein T represents a functional group on a surface of a transition metal carbide (MXene) and comprises at least one of O, OH and F, $0<x<2$; the preparation method comprises the following steps:

S1: subjecting a $Ti_3C_2T_x$ MXene material to liquid nitrogen intercalation and interlayer expansion to obtain a $Ti_3C_2T_x$ MQD nanomaterial;

S2: adding the $Ti_3C_2T_x$ MQD nanomaterial to an aqueous polyamine solution to obtain an aqueous phase solution;

S3: preparing an organic phase solution, wherein the organic phase solution is a polyacyl chloride solution; and S4: immersing an ultrafiltration (UF) base membrane in the aqueous phase solution, then removing the aqueous phase solution from a surface of the UF base membrane through blow-drying; immersing the UF base membrane in the organic phase solution to allow formation of an active layer on the UF base membrane through an interfacial polymerization reaction, resulting in a composite membrane; and allowing the composite membrane to stand, followed by subjecting it to a heat treatment to promote the interfacial polymerization reaction;

wherein S1 comprises:

S11: adding a $Ti_3AlC_2$ powder to an HF solution, and stirring a resulting mixture at 30° C. to 50° C. for 48 h to 72 h to perform etching and to obtain an etched powder; washing the etched powder repeatedly with deionized water and absolute ethanol until a pH of a resulting washing solution is higher than 6.5; and lyophilizing the resulting washing solution by conducting vacuum-drying at −70° C. to −90° C. for 12 h to 36 h to obtain the $Ti_3C_2T_x$ MXene material powder; and S12: adding 1 g to 10 g of the $Ti_3C_2T_x$ MXene material powder obtained in S11 to a polytetrafluoroethylene (PTFE) beaker, pouring 10 mL to 50 mL of liquid nitrogen into the beaker, and placing the beaker at room temperature for 3 min to 10 min; adding 30 mL to 50 mL of deionized water at 80° C. to 100° C. to the beaker to react for 3 min to 5 min, and stirring a resulting reaction mixture at room temperature for 24 h to 36 h; filtering the reaction mixture through a filter membrane with a pore size of 220 nm, and centrifuging a resulting filtrate at 10,000 r/min for 10 min to 30 min to obtain a $Ti_3C_2T_x$ MQD solution; and lyophilizing the $Ti_3C_2T_x$ MQD solution for 24 h to 48 h to obtain the $Ti_3C_2T_x$ MQD nanomaterial.

2. The preparation method according to claim 1, wherein in S2, a preparation process of the aqueous phase solution is as follows: dissolving a polyamine in deionized water, adding the $Ti_3C_2T_x$ MQD nanomaterial, and thoroughly stirring a resulting mixture.

3. The preparation method according to claim 2, wherein in S3, a preparation process of the organic phase solution is as follows: adding a polyacyl chloride to an organic solvent, and thoroughly stirring a resulting mixture.

4. The preparation method according to claim 3, wherein S4 comprises: immersing the UF base membrane in the aqueous phase solution for 2 min to 20 min, and removing the aqueous phase solution from the surface of the UF base membrane through blow-drying with an air knife; immersing the UF base membrane in the organic phase solution for 2 s to 200 s to allow formation of the active layer through the interfacial polymerization reaction; and placing the composite membrane vertically for 50 s to 100 s, followed by subjecting the composite membrane to the heat treatment for 8 min to 20 min in an oven at 40° C. to 90° C. to promote the interfacial polymerization reaction.

5. The preparation method according to claim 3, wherein in S3, the polyacyl chloride is at least one selected from the group consisting of 1,3,5-benzenetricarbonyl trichloride, phthaloyl chloride, isophthaloyl chloride (IPC), 1,3,5-cyclo-hexanetricarbonyl chloride, and methyl m-phenylene diisocyanate; and a mass percentage concentration of the polyacyl chloride is 0.01% to 2.5%.

6. The preparation method according to claim 1, wherein in S11, a mass percentage concentration of the HF solution is 30% to 50%.

7. The preparation method according to claim 6, wherein in S1, the $Ti_3C_2T_x$ MXene material powder has a particle size of 2 nm to 50 nm, and the $Ti_3C_2T_x$ MQD nanomaterial has a thickness of 1 nm to 20 nm.

8. The preparation method according to claim 7, wherein in S2, a polyamine is at least one selected from the group consisting of m-phenylenediamine (MPD), o-phenylenediamine (OPD), p-phenylenediamine (PPD), m-xylylenediamine (MXD), N,N-dimethylphenylenediamine, and 4-methyl-m-phenylenediamine; a mass percentage concentration of the polyamine is 0.1% to 5%, and a mass percentage concentration of the $Ti_3C_2T_x$ MQD nanomaterial is 0.001% to 0.1%.

* * * * *